US008611674B1

(12) United States Patent
Beeler et al.

(10) Patent No.: US 8,611,674 B1
(45) Date of Patent: Dec. 17, 2013

(54) SYSTEM AND METHOD FOR INVARIANT-BASED NORMAL ESTIMATION

(75) Inventors: Thabo Dominik Beeler, Grison (CH); Bernd Bickel, Zurich (CH); Markus Gross, Uster (CH); Robert Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 973 days.

(21) Appl. No.: 12/689,172

(22) Filed: Jan. 18, 2010

(51) Int. Cl.
*G06K 9/68* (2006.01)

(52) U.S. Cl.
USPC ............ 382/218; 382/103; 382/210; 382/300

(58) Field of Classification Search
USPC .................................. 382/103, 210, 218, 300
See application file for complete search history.

(56) References Cited

U.S. PATENT DOCUMENTS

| | | | | |
|---|---|---|---|---|
| 4,891,630 A * | 1/1990 | Friedman et al. | ............. | 345/156 |
| 5,479,257 A * | 12/1995 | Hashimoto | .................. | 356/457 |
| 5,616,866 A * | 4/1997 | Murakami | ...................... | 73/804 |
| 5,761,330 A * | 6/1998 | Stoianov et al. | .............. | 382/127 |
| 5,936,628 A * | 8/1999 | Kitamura et al. | .............. | 345/420 |
| 7,340,077 B2 * | 3/2008 | Gokturk et al. | ............. | 382/103 |
| 7,712,898 B2 * | 5/2010 | Abramoff et al. | .............. | 351/206 |
| 8,040,558 B2 * | 10/2011 | Dosluoglu | ...................... | 358/1.9 |
| 8,179,578 B2 * | 5/2012 | Rosen et al. | ...................... | 359/9 |
| 2001/0033701 A1 * | 10/2001 | Okisu et al. | .................... | 382/284 |
| 2002/0076120 A1 * | 6/2002 | Loce et al. | .................... | 382/300 |
| 2007/0189750 A1 * | 8/2007 | Wong et al. | .................... | 396/121 |
| 2008/0049264 A1 * | 2/2008 | Morimoto et al. | ............ | 358/464 |
| 2010/0289878 A1 * | 11/2010 | Sato et al. | ........................ | 348/46 |

\* cited by examiner

*Primary Examiner* — Vu Le
*Assistant Examiner* — Aklilu Woldemariam
(74) *Attorney, Agent, or Firm* — Patterson & Sheridan LLP

(57) ABSTRACT

A computer-implemented method for invariant-based normal estimation. The method includes calculating a set of measured invariants for a point associated with a surface of an object, where the set of measured invariants is based on pixel information that includes lighting information, calculating one or more sets of estimated invariants for the point associated with the surface of the object, where each set of estimated invariants is based on a known lighting environment for the object and a different normal for the point associated with the surface of the object, and determining a first normal for the point associated with the surface of the object that results in the set of measured invariants corresponding to a first set of estimated invariants.

32 Claims, 7 Drawing Sheets

$$I_\lambda^v = \underbrace{\Omega G^v L_\lambda^v}_{\text{specular}} + \underbrace{D_\lambda}_{\text{diffuse}}$$

$$\begin{bmatrix} \text{2 viewpoints:} & I^1, I^2 \\ \text{3 color channels:} & I_R, I_G, I_B \end{bmatrix}$$

SYSTEM AND METHOD FOR INVARIANT-BASED NORMAL ESTIMATION

BACKGROUND

1. Field of the Invention

The present invention relates to the field of computer graphics and, in particular, to a system and method for invariant-based normal estimation.

2. Description of the Related Art

Recently there has been an increasing demand for three-dimensional (3D) face models. The movie industry relies more and more on computer graphics (CG) to place human actors in situations that are physically not feasible. In some situations, the actor is completely replaced by a corresponding virtual counterpart since the required shots would endanger the actor.

To integrate the actors or their CG representations seamlessly, light and shadows cast from other objects must be matched. Conventional approaches using coarse facial models are not sufficient since the human eye is trained to read faces, so even subtle imperfections are spotted immediately. Also, secondary effects, such as wrinkle formation, are especially hard and tedious to create for an animator, but these secondary effects are essential for natural face appearance.

Physical simulation is currently being investigated for facial capture but is very difficult to implement since the human face is a highly complex and non-linear structure. Currently, the only practical option is to acquire a model of the face using 3D capture. The acquired models can be either integrated directly into a movie or can be used to control other faces. In addition, the movie industry is not the only industry that demands realistic face models. Computer games have a demand for virtual characters. Also, medical science has an interest in such models.

Conventional approaches to 3D capture may be classified as either depth estimation techniques or normal estimation techniques. The depth variation of mesoscopic skin details, such as pores and wrinkles, is in the micrometer range. Most depth estimation techniques simply cannot achieve that level of detail with current hardware. Laser scanning is capable of recovering depth variations at these scales, but this technology produces insufficient results because of the translucency of skin. As a workaround, a plaster mold of the face is scanned instead. Each of these depth estimation techniques suffers from various drawbacks, including the cumbersome process of obtaining a plaster mold of the actor's face.

Normal estimation techniques distinguish between diffuse and specular normals that emanate from the surface of an object. Conventional techniques for normal estimation are based on polarization. The polarization-based normal estimation techniques separate the specular component explicitly from the diffuse component, which is only possible with the use of polarization. However, polarization-based normal estimation has some major drawbacks, since it is restricted to a single viewpoint and reduces the useable light drastically. Furthermore, optical elements such as beam-splitters are very sensitive, thus the whole apparatus has to be handled with care.

As the foregoing illustrates, there is a need in the art for an improved technique for capture of high-resolution models, such as high-resolution face models.

SUMMARY

Embodiments of the invention provide a mathematical framework that factors-out parts of the illumination, enabling the estimation of surface normals from a single exposure. The subject is illuminated with a spatially varying colored light. The light reflected from the surface is a mixture of diffuse and specular components. The diffuse component is less reliable for normal estimation, especially for materials exhibiting subsurface scattering (such as human skin). Thus, only the specular component is used for high quality normal estimation. In contrast to previous methods, which separate the diffuse and specular components explicitly, embodiments of the invention rely on properties that do not depend on the diffuse component. These invariants are computed from both the captured data (measured invariants) and from the known setup (computed invariants). The normals are then estimated by comparing the measured and estimated invariants.

One embodiment of the invention provides a computer-implemented method for invariant-based normal estimation. The method includes calculating a set of measured invariants for a point associated with a surface of an object, where the set of measured invariants is based on pixel information that includes lighting information, calculating one or more sets of estimated invariants for the point associated with the surface of the object, where each set of estimated invariants is based on a known lighting environment for the object and a different normal for the point associated with the surface of the object, and determining a first normal for the point associated with the surface of the object that results in the set of measured invariants corresponding to a first set of estimated invariants.

One advantage of the techniques described herein is that they require only a single exposure of the subject, where previous methods require approximately ten frames. Thus, embodiments of the invention avoid data inconsistencies due to time multiplexing, and no sophisticated data registration is required. Also, there is no loss of details due to data inconsistencies, which allows for higher accuracy for fast changing objects. Moreover, the full frame rate of the capturing device can be used. Another advantage is that embodiments enable high-resolution normal estimation for every viewpoint employed (i.e., large coverage), where previous techniques are restricted to a single viewpoint. Yet another advantage includes simpler and less expensive hardware, since the illumination can be kept static.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
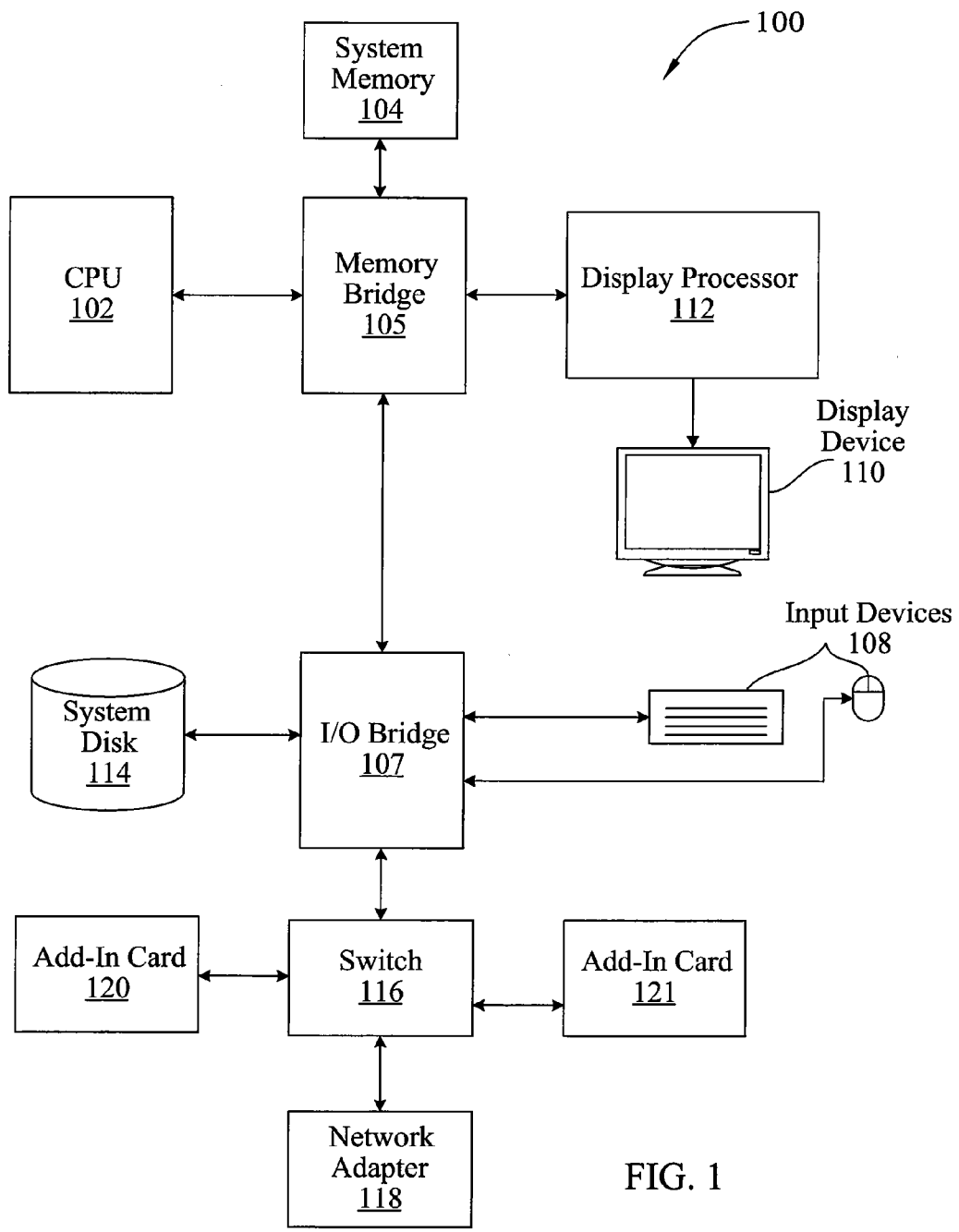
FIG. 1 is a block diagram of a system configured to implement one or more aspects of the present invention.

Embodiments of the invention provide a mathematical framework that factors-out parts of the illumination, enabling the estimation of surface normals from a single exposure. The subject is illuminated with a spatially varying colored light. The light reflected from the surface is a mixture of diffuse and specular components. The diffuse component is less reliable for normal estimation, especially for materials exhibiting subsurface scattering (such as human skin). Thus, only the specular component is used for high quality normal estimation. In contrast to previous methods, which separate the diffuse and specular components explicitly, embodiments of the invention rely on properties that do not depend on the diffuse component. These invariants are computed from both the captured data (measured invariants) and from the known setup (computed invariants). The normals are then estimated by comparing the measured and estimated invariants.

One embodiment of the invention provides a computer-implemented method for invariant-based normal estimation. The method includes calculating a set of measured invariants for a point on a surface of a subject, where the set of measured invariants is based on pixel information captured by one or more cameras; calculating one or more sets of estimated invariants for the point on the surface of the subject, where each set of estimated invariants is based on a calibrated lighting environment for the subject and a different normal for the point on the surface of the subject; determining a first normal for the point on the surface of the subject that results in the set of measured invariants corresponding to a first set of estimated invariants; and generating a three-dimensional geometry for the subject based on the first normal.

Skin is a complex structure that includes a variety of components. In some embodiments, skin can be considered at three different scales: a microscopic scale, a mesoscopic scale, and a macroscopic scale. Skin features in the microscopic scale are not perceivable in images captured by cameras, while the macroscopic scale is too coarse to be suited for detailed features. At the mesoscopic scale, features may be classified into two groups. A first group is based on color variation. Spots, freckles, and moles are examples of the first group of mesoscopic scale features. A second group is based on geometric variation. Pores, fine wrinkles, and facial hair belong to this group. According to embodiments of the invention, capturing the mesoscopic details is desirable when capturing a model of subject such as the human face.

As is known, surfaces such as skin may include multiple layers that affect the reflected light. For example, depending on the physical properties of the surface, a light beam may be reflected away from the surface, scattered by the surface, transmitted through the surface, scattered upon transmission through the surface, and may undergo subsurface scattering caused by the surface, among others. Using skin as an example, the topmost layer is a very thin layer covered with an oily secretion. This layer absorbs almost no light and is responsible for the direct reflection. The spectral composition of the light is altered only slightly, which means that the reflected light appears the same color as the source. The deeper layers of the skin, such as the epidermis and dermis, scatter and absorb the light and, thus, alter the spectral composition considerably. The scattering blurs the incident light and the resulting distribution tends to become isotropic. This is true even if the light source is highly anisotropic. It is thus common to separate the reflected radiance $L_o$ into a specular component $L_{o,s}$, which accounts for the direct reflection at the interface, and a diffuse component $L_{o,d}$ such that the total radiance $L_o = L_{o,d} + L_{o,s}$.

Thus, according to embodiments of the invention, the goal is the remove the diffuse components from the calculation, leaving only the specular components. Once specular information is determined, one can estimate the normal at a particular point. A surface normal provides a good indication of local structure of the surface since normals are very sensitive to small variations. Knowing the surface normals allows one to know the small details of the surface by integrating the normals across the surface of the object.

System Overview

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, normals are estimated for points on a surface by comparing measured invariants to estimated invariants. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Overview of Example Embodiment

Figure 2:
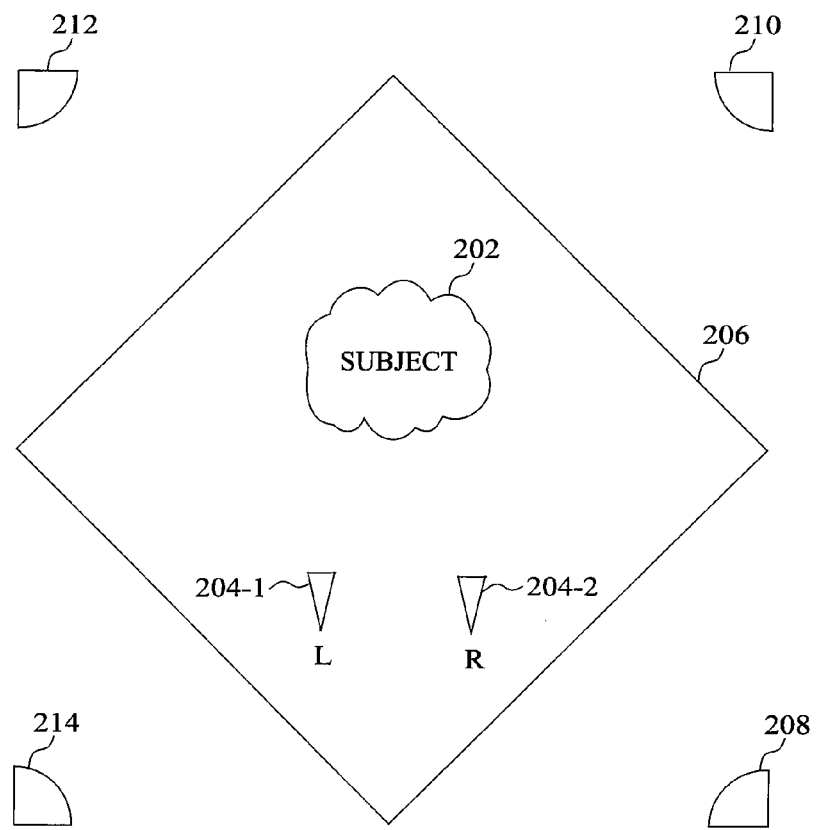
FIG. 2 illustrates a calibrated setup for performing invariant-based normal estimation, according to one embodiment of the invention.

As described in greater detail herein, embodiments of the invention require knowledge of the illumination in a calibrated setup. FIG. 2 illustrates a calibrated setup for performing invariant-based normal estimation, according to one embodiment of the invention. A subject 202 is placed inside a light stage 206 with two cameras 204-1, 204-2. In other embodiments, the cameras 204-1, 204-2 are placed outside the light stage 206 and capture the subject 202 through cut-outs. In one embodiment, the light stage 206 comprises a light tent. In other embodiments, the light stage 206 comprises a light dome. In some embodiments, a light dome provides a better, but more costly, illumination device than a light tent. Light emitting devices 208, 210, 212, and 214 illuminate the light stage 206 from the southeast, northeast, northwest, and southwest, respectively. In some embodiments, additional light emitting devices could be used to illuminate the top and bottom of light stage 206 as well. Light tents are commonly used in product photography and may be comprised of white diffusing fabric. In the example shown in FIG. 2, the light stage 206 has a cubic shape. In other embodiments, any shape light stage can be used, such as a spherical shape. In one embodiment, the light emitting devices 208, 210, 212, and 214 are light, projectors, or any other type of light source. Also, in some embodiments, more than two cameras are used. For example, three cameras may be used.

To properly calibrate the environment, the cameras are calibrated. Camera calibration is a well-known problem and can be accomplished using any known technique. In some embodiments, any type of sensing device, such as a light sensing device or a camera, may be used to implement embodiments of the invention. Also, the light stage 206 is calibrated so that both location and color of a plurality of points on the surface of light stage 206 are known. In one embodiment, light stage may be sampled at a random at a plurality of points and the location and color is determined for each point in the plurality of points. Again, many different techniques can be used to calibrate the light stage 206. For example, several approaches to reconstructing the geometry of the light stage 206 may rely on a calibration sphere. A mirrored chrome ball having a known radius can be placed at the location of the subject 202. The calibration sphere has a high reflection coefficient (e.g., approximately 90%) and reflects much of the setup shown in FIG. 2. For each point on the light stage 206 that is reflected by the calibration sphere, embodiments of the invention can determine a position of the point on the light stage 206. Also, light emitting devices 208, 210, 212, and 214 are calibrated to generate a known gradient illumination.

Figure 3:
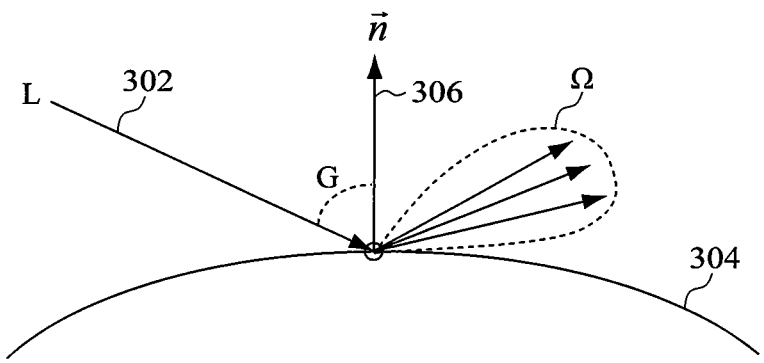
FIG. 3 is a conceptual diagram of a light ray reflecting from a surface, according to one embodiment of the invention.
Figure 4A:
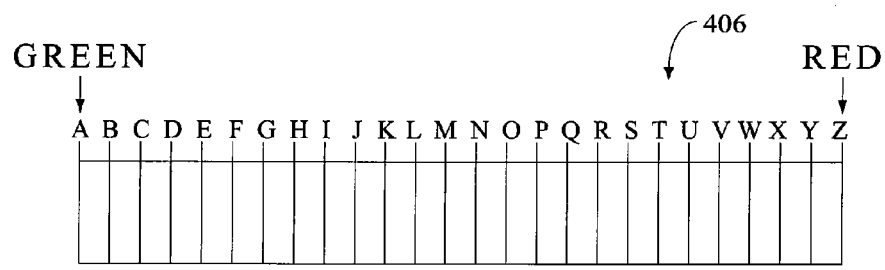
FIG. 4A is a conceptual diagram of light from two different viewpoints reflecting from the surface of a subject, according to one embodiment of the invention.
Figure 4A:
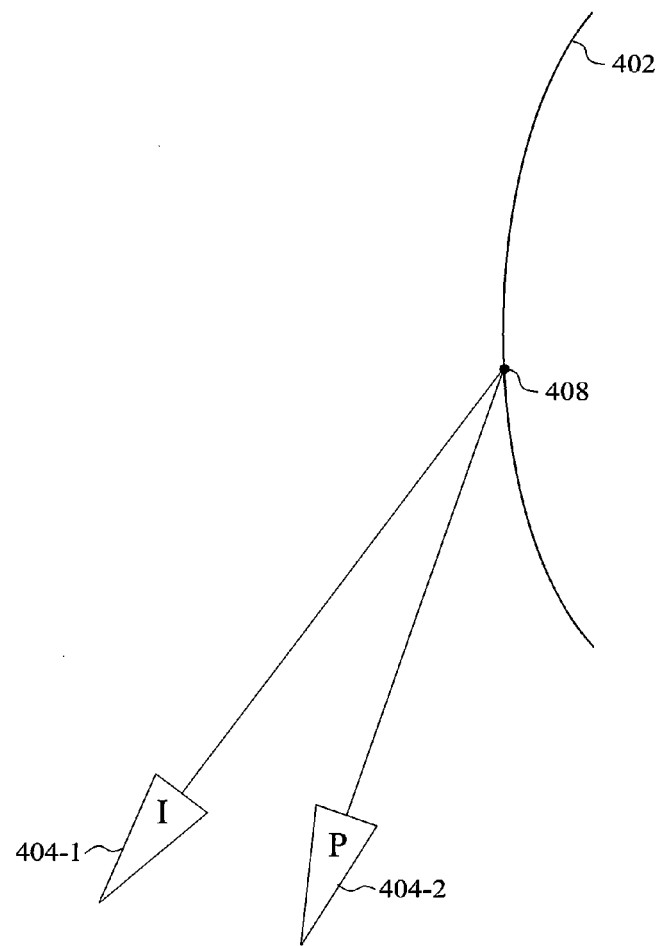
Figure 4B:
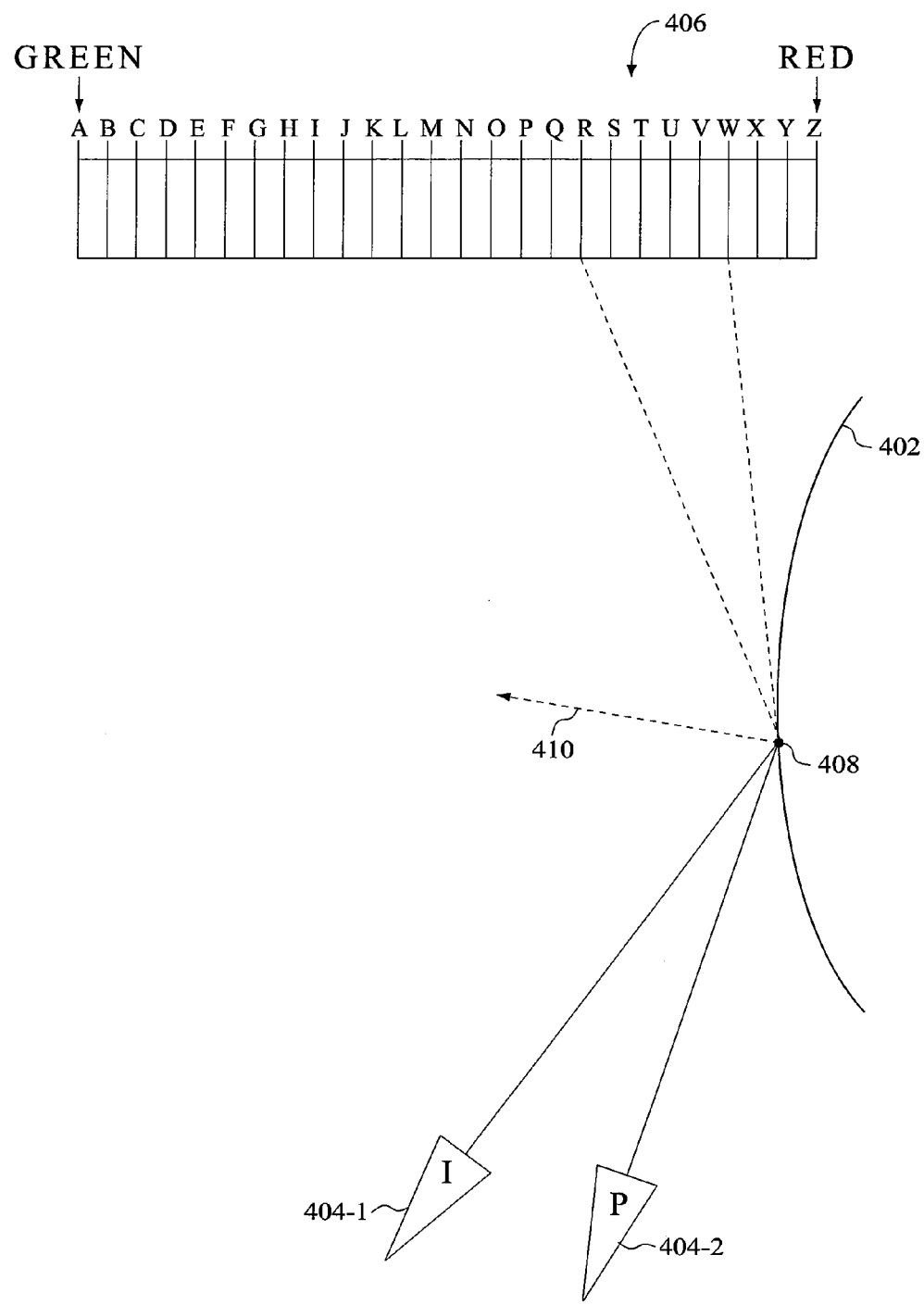
FIG. 4B is a conceptual diagram of a first surface normal that does not cause the measured invariants to equal the estimated invariants, according to one embodiment of the invention.
Figure 4C:
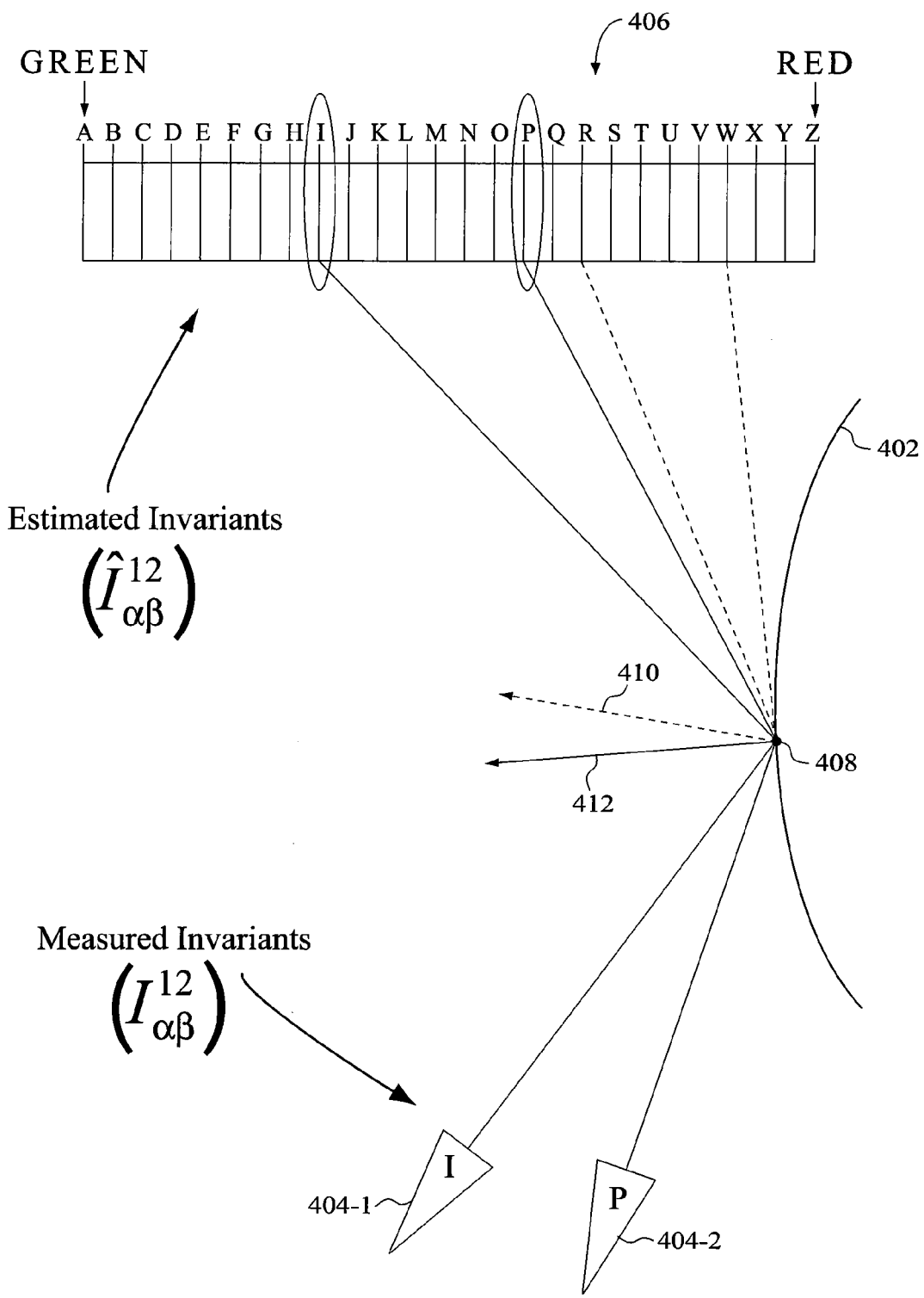
FIG. 4C is a conceptual diagram of a second surface normal that does cause the measured invariants to equal the estimated invariants, according to one embodiment of the invention.

Turning now to FIGS. 3-4C, these figures present a simplified explanation of embodiments of the invention that rely on invariant-based normal estimation. Some of the mathematical equations presented in FIGS. 3-4C are simplified for clarity. Fully explicit mathematical equations and derivations are also described herein.

FIG. 3 is a conceptual diagram of a light ray 302 reflecting from a surface 304, according to one embodiment of the invention. In simplified and short-hand form, an equation to describe the manner in which the light ray 302 reflects from the surface 304 may be:

$$I_\lambda^v = \Omega G^v L_\lambda^v + D_\lambda \quad \text{(Equation 1.1)},$$

where I is the image intensity, $\Omega$ represents a physical law of how much light is reflected and in which direction, G represents a geometrical relationship between the angle of the light ray L relative to a surface normal 306, and D represents a diffuse component of the reflected light. The superscript $v$ corresponds to one of at least two viewpoints and the subscript $\lambda$ corresponds to a different color channel of light (e.g., red, green, or blue). According to Equation 1.1, the image intensity I, the geometrical relationship G, and the light ray L are based on the viewpoint; whereas, the image intensity I, the light ray L, and the diffuse component D are based on the color channel. In one embodiment, as shown in FIG. 3, a system may be configured with two viewpoints (e.g., two cameras), each having three color channels (e.g., red, green, blue). As shown in Equation 1.1, the diffuse component D of the reflection is not based on the viewpoint.

In order to cancel-out the diffuse component D from Equation 1.1, the image intensity values can be subtracted for two different viewpoints for the same color channel:

$$I_\lambda^a - I_\lambda^b = (\Omega G^a L_\lambda^a + D_\lambda) - (\Omega G^b L_\lambda^b + D_\lambda) \quad \text{(Equation 1.2)},$$

which can be simplified to:

$$I_\lambda^a - I_\lambda^b = \Omega(G^a L_\lambda^a - G^b L_\lambda^b) \quad \text{(Equation 1.3)}.$$

Dividing Equation 1.3 for a first color channel ($\alpha$) by Equation 1.3 for a second color channel ($\beta$) results in the following equation:

$$\frac{I_\alpha^a - I_\alpha^b}{I_\beta^a - I_\beta^b} = \frac{G^a L_\alpha^a - G^b L_\alpha^b}{G^a L_\beta^a - G^b L_\beta^b}. \quad \text{(Equation 1.4)}$$

In some embodiments, the left side of Equation 1.4 is referred to as "measured invariants" and the right side of Equation 1.4 is referred to as "estimated invariants." The measured invariants depend on the pixel intensity values recorded off a particular point on the surface of the object; whereas, the estimated invariants depend on the direction of light in the calibrated environment at the particular point. As described in greater detail herein, embodiments of the invention attempt to equate the measured invariants and the estimated invariants to determine a surface normal. Determining the surface normal for each point on the surface of the subject generates a normal map. Using known techniques, the fine details of the geometry of the subject can be reconstructed from the normal map.

FIG. 4A is a conceptual diagram of light from two different viewpoints reflecting from the surface 402 of a subject, according to one embodiment of the invention. As shown, cameras 404-1, 404-2 capture an image of the surface 402. Referring to Equation 1.4, viewpoint "a" corresponds to camera 404-1, and viewpoint "b" corresponds to camera 404-2. Also, in the example shown in FIG. 4A, each camera is configured to capture images in three color channels, e.g., red-green-blue (RGB). In one embodiment, color channel $\alpha$ corresponds to a green color channel and color channel $\beta$ corresponds to a red color channel in the RGB color scheme. In other embodiments, any color channels may be selected. As shown in FIG. 4A, gradient 406 is a conceptual illustration of a color gradient from fully GREEN (i.e., location A on gradient 406) to fully RED (i.e., location Z on gradient 406). Other intermediate locations are present in the gradient 406, represented by the locations B through Y. The other locations B through Y on gradient 406 represent a blend of the green and red colors.

According to embodiments of the invention, the "correct" surface normal at point 408 causes the measured invariants to be equal to (or approximately equal to) the estimated invariants. In the example shown in FIG. 4A, the measured invariants for camera 404-1 in the green-red spectrum correspond to location I in the gradient 406, and the measured invariants for camera 404-2 in the green-red spectrum correspond to location P in the gradient 406.

FIG. 4B is a conceptual diagram of a first surface normal that does not cause the measured invariants to equal the estimated invariants, according to one embodiment of the invention. In some embodiments of the invention, a first surface normal is selected and the estimated invariants are computed based on the selected surface normal. In the example shown in FIG. 4B, surface normal 410 is selected. Based on computing the right-hand side of Equation 1.4, selecting surface normal 410 causes the light from camera 404-1 to reflect to location R on the spectrum 406, and causes the light from camera 404-2 to reflect to location W on the spectrum 406. Since the measured invariants for cameras 404-1, 404-2 map to locations I and P, respectively, selecting the normal 410 does not cause the measured invariants to equal the estimated invariants.

FIG. 4C is a conceptual diagram of a second surface normal that does cause the measured invariants to equal the estimated invariants, according to one embodiment of the invention. As shown, surface normal 412 is now selected. Based on computing the right-hand side of Equation 1.4, selecting surface normal 412 causes the light from camera 404-1 to reflect to location I on the spectrum 406, and causes the light from camera 404-2 to reflect to location P on the spectrum 306. Since the measured invariants for cameras 404-1, 404-2 also map to locations I and P, respectively, selecting the normal 412 causes the measured invariants to equal the estimated invariants. Thus, surface normal 412 is the "correct" surface normal for point 408 on surface 402. In one embodiment, the surface normals can be tested one at a time until a match between the measured invariants and the estimated invariants is found. In some embodiments, various mathematical techniques can be implemented to speed up the process of selecting the correct surface normal, such as conjugate gradients.

As described herein, embodiments of the invention do not explicitly calculate the diffuse and specular components of the reflected light, i.e., embodiments do not explicitly extract the diffuse components. In other words, embodiments of the invention do not calculate the absolute values of the diffuse or specular components, but rather determine the change in the specular component. Since the illumination is known from the calibrated setup, the normal can be computed, and the details of the geometry are generated from the normals.

The robustness of the normal estimation increases with the number of invariants used. In various embodiments, invariants can be added by adding more colors (i.e., more light frequency bands) or adding more viewpoints (i.e., more cameras). Additional invariants can be added by changing in the illumination over time and capturing multiple images per viewpoint, but this approach introduces additional complexities.

Figure 5:
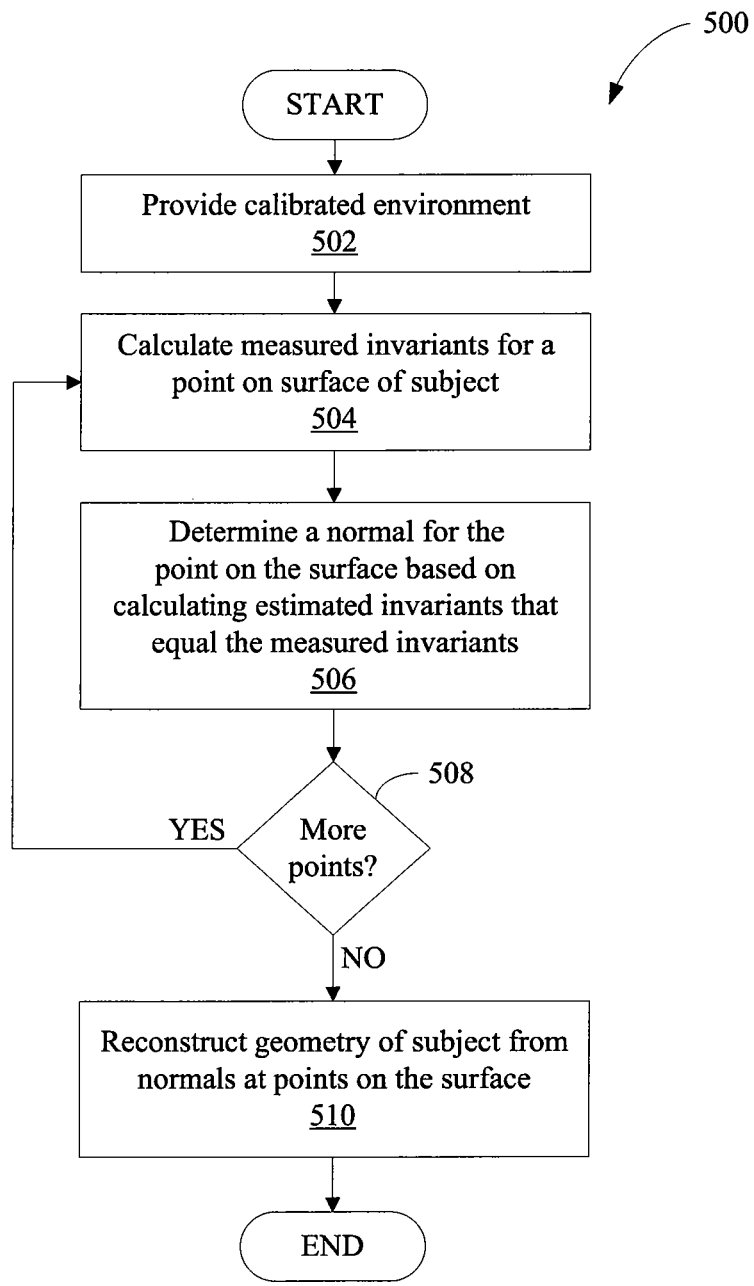
FIG. 5 is a flow diagram of method steps for performing invariant-based normal estimation, according to one embodiment of the invention.

FIG. 5 is a flow diagram of method steps for performing invariant-based normal estimation, according to one embodiment of the invention. Persons skilled in the art will understand that, even though the method 500 is described in conjunction with the system of FIG. 1-4C, any system configured to perform the method steps, in any order, is within the scope of embodiments of the invention.

As shown, the method 500 begins at step 502, where a calibrated environment is provided. As described in greater detail herein, to properly calibrate the environment, the camera is calibrated. Camera calibration is a well-known problem and can be accomplished using any known technique. Also, a light tent that encloses the subject to be captured is calibrated, so that the location in space and the color of the emitted light are known for each point on the surface of the light tent. Again, many different techniques can be used to calibrate the light tent. For example, several approaches to reconstructing the geometry of the light tent may rely on a calibration sphere, as described herein. Also, the light emitting devices that illuminate the subject are calibrated to generate a known gradient illumination.

At step 504, a processor calculates measured invariants for a point on a surface of a subject. In some embodiments, the measured invariants are based on the color intensity values of the pixels that correspond to the point on the surface captured from different viewpoints. As described in FIGS. 4A-4C, the measured invariants may be based on a color gradient between two color channels from two viewpoints. In some embodiments, measured invariants are calculated for each pair of color channels for each pair of viewpoints and summed together to achieve a total measured invariant value.

At step 506, the processor determines a normal for the point on the surface based on calculating estimated invariants that are equal to or approximately equal to the measured invariants. As described in greater detail herein, the estimated invariants are based on the calibrated environment, i.e., based on the incident light and the normal. By calculating the estimated invariants using different normals, the processor determines the "correct" normal that causes the measured invariants to equal the estimated invariants. In some embodiments, the measured invariants are not equal the estimated invariants, and a minimization problem is solved by selecting the normal that achieves the smallest difference between the measured invariants and the estimated invariants.

At step 508, the processor determines whether any additional points exist on the surface for which a normal has not been determined. If the processor determines that at least one additional point exists on the surface for which a normal has not been determined, then the method 500 proceeds to step 504, described above. If the processor determines that no additional point exists on the surface for which a normal has not been determined, then the method 500 proceeds to step 510.

At step 510, the processor reconstructs the geometry of the subject from the normals at the points on the surface. A surface normal provides a good indication of how the surface is locally oriented since normals are very sensitive to small variations. In one embodiment, knowing the surface normals allows the processor to determine the small details of the surface by integrating the normals across the surface of the object. In other embodiments, any technically feasible technique for geometry reconstruction from normal information can be used to implement step 510.

In sum, embodiments of the invention provide a framework for estimating surface normals of human faces based on invariant-based normal estimation. Importantly, the techniques described herein do not rely on the specular component explicitly. Instead, this approach estimates the normals based upon invariants with respect to the diffuse component. The invariants are properties that depend only on the specular component, and not on the diffuse component. Compared with the polarization-based techniques, embodiments of the invention are not restricted to a single viewpoint, but rely on at least two viewpoints. In fact, the robustness of embodiments of the invention increases with the number of viewpoints.

The invariants presented herein are formed by combining information from different color channels and multiple viewpoints for the same point on the subject. It is therefore important to know the corresponding points in all viewpoints involved. In some embodiments, stereo reconstruction techniques can provide these correspondences. In other embodiments, any technique for finding the correspondences can be used. A second requirement is complete knowledge of what color originates from which point in space. Various techniques known to those skilled in the art can be used to calibrate the setup required to achieve invariant-based normal estimation.

Additionally, embodiments of the invention present a system capable of capturing surface orientation from a single exposure. This feature enables capturing subjects at full frame rate without introducing artifacts or loss of detail. Embodiments of the invention can therefore capture faster moving objects with higher accuracy than any existing method. Since there is no need for dynamic illumination or other changing elements, the system can be realized at greatly reduced cost and is less maintenance-intensive, when compared to conventional polarization-based systems. Another major advantage compared to polarization-based techniques is more coverage. While polarization-based techniques are restricted to a single viewpoint, this system provides the same high quality capture for every viewpoint employed.

One advantage of the techniques described herein is that they require only a single exposure of the subject, where previous methods require approximately ten frames. Thus, embodiments of the invention avoid data inconsistencies due to time multiplexing, and no sophisticated data registration is required. Also, there is no loss of details due to data inconsistencies, which allows for higher accuracy for fast changing objects. Moreover, the full frame rate of the capturing device can be used. Another advantage is that embodiments enable high-resolution normal estimation for every viewpoint employed (i.e., large coverage), where previous techniques are restricted to a single viewpoint. Yet another advantage includes simpler and less expensive hardware, since the illumination can be kept static. Furthermore, no light dissipating elements, such as polarizers or beamsplitters, are required. This feature increases the energy efficiency of the system, leading to less energy requirements and, thus, more economic and ecologic operation.

Invariant-Based Normal Estimation—Mathematical Derivations

I. Overview

As described above, the reflected radiance $L_o$ can be separated into a specular component $L_{o,s}$, which accounts for the direct reflection at the interface, and a diffuse component $L_{o,d}$:

$$L_o = L_{o,d} + L_{o,s} \quad \text{(Equation 2.1)}$$

In some embodiments, the contribution of the incident radiance $L_i$ to the different components is given by the Fresnel equations for dielectrics:

$$L_{i,s} = F_r(\vec{w}_i, \vec{n}_i) L_i \quad \text{(Equation 2.2)}$$

and $$L_{i,d} = F_t(\vec{w}_i, \vec{n}_i) L_i = (1 - F_r(\vec{w}_i, \vec{n}_i)) L_i \quad \text{(Equation 2.3)},$$

where $\vec{n}_i$ is shorthand for $\vec{n}(\vec{x}_i)$. $F_r$ and $F_t$ are functions of the incident angle and depend on the refractive indices of the involved media. The refractive index $\eta$, and thus the Fresnel terms, depend on the wavelength of the light. However, little is known about this dependency for human skin, so $\eta$ can be approximated by a constant. This approach provides good results for skin since the direct reflection is mostly due to the oily secretion on the skin and the variation of $\eta$ for mineral oil is approximately 0.78% over the visible spectrum. Some embodiments use a refractive index of 1.38. In other embodiments, $\eta$ is not a constant, and the spectral dependency of the Fresnel terms may be included in calculations for completeness.

As is known, surface reflectance functions relate incoming irradiance to outgoing radiance. One example of a surface reflectance function is the Bidirectional Reflectance Distribution Function (BRDF). The BRDF function is defined as the differential amount of reflected radiance in the outgoing direction per differential incident irradiance in the incoming direction. In one embodiment, the specular reflection function is chosen to be a bidirectional reflectance distribution function (BRDF):

$$L_{o,s}(\vec{x}_o, \vec{w}_o, \lambda) = \int_\Omega c_S(\vec{x}_o) S(\vec{x}_o, \vec{w}_o, \vec{n}_o, \vec{n}_o, \vec{w}_i) G(\vec{w}_i, \vec{n}_i, \lambda) L_i(\vec{x}_o, \vec{w}_i, \lambda) d\vec{w}_i \quad \text{(Equation 2.4)},$$

with $c_S > 0$ being the specular attenuation and $S \in [0; 1]$ the specular reflectance lobe. G is a geometry term containing the Fresnel term $F_r(\vec{w}_i, \vec{n}_i, \lambda)$ as well as the foreshortening $f(\vec{w}_i, \vec{n}_i) = \max(0, \langle \vec{n}_i, \vec{w}_i \rangle)$. We assume S to be symmetric around the perfect reflection direction and non-zero within a small solid angle only. We do not assume that S is constant within this area, though.

For the diffuse reflectance function, embodiments of the invention use the diffuse approximation $S_d$:

$$S_d(\vec{x}_o, \vec{w}_o; \vec{x}_i, \vec{x}_o, \lambda) = 1/\pi F_t(\vec{w}_o, \vec{n}_o, \lambda) R_d(\|\vec{x}_i - \vec{x}_o\|, \lambda) F_t(\vec{w}_i, \vec{n}_i, \lambda) \quad \text{(Equation 2.5)},$$

where $R_d$ is the diffuse reflectance due to dipole source. Embodiments also include the wavelength $\lambda$ to express the spectral dependency explicitly. With $S_d$, the diffuse reflected radiance amounts to:

$$L_{o,d}(\vec{x}_o, \vec{w}_o, \lambda) = \int_A \int_\Omega S_d(\vec{x}_o, \vec{w}_o; \vec{x}_i, \vec{x}_o, \lambda) f(\vec{w}_i, \vec{n}_i) L_i(\vec{x}_i, \vec{w}_i, \lambda) d\vec{w}_i dA(\vec{x}_i)$$

(Equation 2.6).

The only term in $S_d$ in Equation 2.6 that depends on the outgoing direction $\vec{w}_o$ is the outgoing Fresnel term $F_t(\vec{w}_o, \vec{n}_o)$. Thus, if we pull this term out of the integral, the remaining part is invariant with respect to the viewing direction $\vec{w}_o$ and we substitute it by $D(\vec{x}_o, \lambda)$:

$$L_{o,d}(\vec{x}_o, \vec{w}_o, \lambda) = F_t(\vec{w}_o, \vec{n}_o, \lambda) D(\vec{x}_o, \lambda) \quad \text{(Equation 2.7)}$$

As described, the reflectance model presented herein is designed to separate the diffuse component from the specular component. Thus, the goal of embodiments of the invention is to derive properties that do not depend on the diffuse part of the light. The derivations described below are based on the surface reflectance model introduced in Equations 2.1 to 2.7, but alternative embodiments use any technically feasible reflectance model.

II. Diffuse Invariants

According to embodiments of the invention, different classes of invariants may me used. Diffuse invariants are invariant under the diffuse components of the light. BRDF invariants are also invariant under the chosen surface BRDF. Embodiments of the invention estimate surface normals based on one or more of these invariants.

Again, the radiance $L_o$ is modeled as $$L_o = L_{o,d} + L_{o,s} \quad \text{(Equation 3.1)}$$

and the diffuse component is given by $$L_{o,d}(\vec{x}_o, \vec{w}_o, \lambda) = F_t(\vec{w}_o, \vec{n}_o, \lambda) D(\vec{x}_o, \lambda). \quad \text{(Equation 3.2)}$$

If we divide $L_o$ by the transmissive Fresnel coefficient $F_t$, the diffuse reflectance will amount to D, which is independent of the viewing direction $\vec{w}_o$:

$$\frac{L_o(\vec{x}_o, \vec{w}_v, \lambda)}{F_t(\vec{w}_o, \vec{n}_o, \lambda)} = \frac{L_{o,s}(\vec{x}_o, \vec{w}_v, \lambda)}{F_t(\vec{w}_o, \vec{n}_o, \lambda)} + D(\vec{x}_o, \lambda). \quad \text{(Equation 3.3)}$$

To eliminate D from Equation 3.3, embodiments of the invention use the measurements from different viewpoints. As a simplification, we will use the following abbreviation $L_\lambda^v = L_o(\vec{x}_o, \vec{w}_v, \lambda)$, where v denotes the viewpoint and $\lambda$ the wavelength. By subtracting the measurement from two different viewpoints for the same point in the scene, the result is the following equation:

$$L_\lambda^{ab} = \frac{L_\lambda^a}{F_{t,\lambda}^a} - \frac{L_\lambda^b}{F_{t,\lambda}^b}, \quad \text{(Equation 3.4)}$$

which can be expanded to $$L_\lambda^{ab} = \frac{L_{o,s}(\vec{x}_o, \vec{w}_a)}{F_t(\vec{w}_a, \vec{n}_o, \lambda)} + D(\vec{x}_o, \lambda) - \frac{L_{o,s}(\vec{x}_o, \vec{w}_b)}{F_t(\vec{w}_b, \vec{n}_o, \lambda)} - D(\vec{x}_o, \lambda), \quad \text{(Equation 3.5)}$$

and after rearranging $$L_\lambda^{ab} = \frac{L_{o,s}(\vec{x}_o, \vec{w}_a)}{F_t(\vec{w}_a, \vec{n}_o, \lambda)} - \frac{L_{o,s}(\vec{x}_o, \vec{w}_b)}{F_t(\vec{w}_b, \vec{n}_o, \lambda)}. \quad \text{(Equation 3.6)}$$

As shown, Equation 3.6 does not depend on the diffuse components of the reflected radiance and is thus called a "diffuse invariant."

III. BRDF Invariants

The previously introduced diffuse invariants leave only the specular component, as:

$$L_{o,s}(\vec{x}_o, \vec{w}_o, \lambda) = c_S(\vec{x}_o) \int_{\Omega} S(\vec{x}_o, \vec{w}_o, \vec{n}_o, \vec{w}_i) G(\vec{w}_i, \vec{n}_i, \lambda) L_i(\vec{x}_o, \vec{w}_i, \lambda) d\vec{w}_i \quad \text{(Equation 3.7.1)}$$

However, Equation 3.7.1 still includes unknowns. Embodiments of the invention involve properly calibrating the environment to allow for computation of foreshortening, the Fresnel term, as well as the radiance of the gradient for a specific direction $\vec{w}_i$. The problem is that we have no knowledge about S except the assumption that the lobe is expected to enclose a small solid angle $\Omega_r$ around the perfect reflection $\vec{w}_r$ of $\vec{w}_o$. We assume that the gradient and the foreshortening remain approximately constant within this solid angle. Therefore, we can pull them out of the integral:

$$L_{o,s}(\vec{x}_o, \vec{w}_o, \lambda) \approx c_S(\vec{x}_o) G(\vec{w}_r, \vec{n}_o, \lambda) L_i(\vec{x}_o, -\vec{w}_r, \lambda) \int_{\Omega_r} S(\vec{x}_o, \vec{w}_o, \vec{n}_o, \vec{w}_i) d\vec{w}_i \quad \text{(Equation 3.7.2)}$$

We are still left with an integral over the specular lobe, which we can approximated by the midpoint rule as:

$$\int_{\Omega_r} S(\vec{x}_o, \vec{w}_o, \vec{n}_o, \vec{w}_i) d\vec{w}_i \approx \Omega_r \bar{S}(\vec{x}_o) \quad \text{(Equation 3.8)}.$$

With this simplification, we get the final approximation of the specular component as $$\hat{L}_{o,s}(\vec{x}_o, \vec{w}_o, \lambda) = c_S(\vec{x}_o) \Omega_r \bar{S}(\vec{x}_o) G(\vec{w}_o, \vec{n}_o, \lambda) L_i(\vec{x}_o, -\vec{w}_r, \lambda) \quad \text{(Equation 3.9)},$$

where we substituted $G(\vec{w}_o, \vec{n}_o, \lambda)$ for $G(\vec{w}_r, \vec{n}_o, \lambda)$. This is valid due to the Helmholtz reciprocity. If we substitute Equation 2.9 back into Equation 2.6 we get:

$$L_\lambda^{ab} \approx c_s(\vec{x}_o) \Omega_r \bar{S}(\vec{x}_o) \left[ \frac{G(\vec{w}_a, \vec{n}_o, \lambda)}{F_t(\vec{w}_a, \vec{n}_o, \lambda)} L_i(\vec{x}_o, -\vec{w}_{ra}, \lambda) - \frac{G(\vec{w}_b, \vec{n}_o, \lambda)}{F_t(\vec{w}_b, \vec{n}_o, \lambda)} L_i(\vec{x}_o, -\vec{w}_{rb}, \lambda) \right]. \quad \text{(Equation 3.10)}$$

To cancel out the unknowns, embodiments of the invention divide the reflected radiance of two different wavelengths:

$$L_{\alpha\beta}^{ab} = \frac{L_\alpha^{ab}}{L_\beta^{ab}}. \quad \text{(Equation 3.11)}$$

This property does not depend on the assumed BRDF anymore and is thus called a "BRDF invariant."

IV. Estimated and Measured Invariants

As described herein, each of the previously-derived invariants can be computed in two different ways: as estimated invariants or measured invariants. Using estimated invariants involves computing the invariants from the known scene setup. For this computation, embodiments of the invention are based on a calibrated system and a specific location of a point being estimated. The estimated invariants are marked by a carrot ($\hat{\ }$):

$$\hat{L}_{\alpha\beta}^{ab} = \frac{F_{t,\beta}^a F_{t,\beta}^b}{F_{t,\alpha}^a F_{t,\alpha}^b} \left[ \frac{F_{t,\alpha}^b G_\alpha^a L_\alpha^a - F_{t,\alpha}^b G_\alpha^b L_\alpha^b}{F_{t,\beta}^b G_\beta^a L_\beta^a - F_{t,\beta}^b G_\beta^b L_\beta^b} \right]. \quad \text{(Equation 3.12)}$$

Measured invariants are derived from the pixel color intensity of the captured imagery. The invariant theory constructed so far relies on reflected object radiance $L_o$, but the images recorded by the cameras contain intensity values I. Thus, embodiments of the invention are based on a relationship between intensity values I and object radiance $L_o$. The first step is to recover the image irradiance $E_i$ incident to a pixel from the intensity values I. The second step is to relate the image irradiance $E_i$ to the object radiance $L_o$.

First, to recover image irradiance E from image intensity I, embodiments of the invention assume that the cameras operate on three color channels (i.e., red, green, and blue). In some embodiments, for each color channel, I and E are related by the camera response function:

$$I = f(E\Delta t) \quad \text{(Equation 3.13)},$$

where $\Delta t$ denotes the exposure time, sometimes also called shutter speed. Embodiments of the invention assume that f is monotonic and, thus, Equation 3.13 is invertible and may be rewritten as:

$$E = \frac{f^{-1}(I)}{\Delta t}. \quad \text{(Equation 3.14)}$$

For CCD (charge-coupled device) and most CMOS (complementary metal-oxide-semiconductor) cameras, f is a linear function, and so Equation 3.14 may be expressed as:

$$E = \frac{\alpha I + b}{\Delta t}. \quad \text{(Equation 3.15)}$$

Next, embodiments of the invention recover object radiance L from the image irradiance E. Image irradiance E is related to incident radiance $L_i$ according to:

$$E = L_i \frac{\pi}{4} \left(\frac{d}{f}\right)^2 \cos^4 \alpha, \quad \text{(Equation 3.16)}$$

where d is the diameter of the lens, f the focal distance, and $\alpha$ the angle between the incoming ray and the optical axis. Modern cameras are constructed such that the image covers only a narrow angle around the optical axis. Therefore, $\alpha$ may be considered constant over the whole image and especially in the center, where the subject is captured. Thus, the image irradiance is proportional to the incident radiance $$L_i = \kappa E \quad \text{(Equation 3.17)}.$$

Since we can neglect participating media in our controlled setup, the incident radiance $L_i$ corresponds to the exiting object radiance $L_o$ and thus $$L_o = \kappa \frac{f^{-1}(I)}{\Delta t}. \quad \text{(Equation 3.18)}$$

We can eliminate $\Delta t$ and $k$ by combining Equations 3.11 and 3.18. The measured invariants are, therefore, also invariant with respect to exposure time:

$$L^{ab}_{\alpha\beta} = \frac{F^a_{t,\beta}F^b_{t,\beta}}{F^a_{t,\alpha}F^b_{t,\alpha}}\left[\frac{F^b_{t,\alpha}f^{-1}_a(I^a_\alpha) - F^a_{t,\alpha}f^{-1}_b(I^b_\alpha)}{F^b_{t,\beta}f^{-1}_a(I^a_\beta) - F^a_{t,\beta}f^{-1}_b(I^b_\beta)}\right]. \quad \text{(Equation 3.19)}$$

It is further possible to remove all dependency on the camera response functions if they are linear and the same for all channels and cameras involved:

$$L^{ab}_{\alpha\beta} = \frac{F^a_{t,\beta}F^b_{t,\beta}}{F^a_{t,\alpha}F^b_{t,\alpha}}\left[\frac{F^b_{t,\alpha}I^a_\alpha - F^a_{t,\alpha}I^b_\alpha}{F^b_{t,\beta}I^a_\beta - F^a_{t,\beta}I^b_\beta}\right]. \quad \text{(Equation 3.20)}$$

Equation 3.20 is quite convenient since the equation allows embodiments of the invention to compute directly on the image intensity values I.

V. Invariant Count

Note that in some embodiments the amount of invariants one can expect depends on the amount of viewpoints and wavelengths involved. In embodiments of the invention that involve common tristimulus hardware (i.e., RGB), only the number of viewpoints can be changed. In this case, the maximal invariant count is $$|L^{ab}_\lambda| = \frac{3|v|(|v|-1)}{2} \quad \text{(Equation 3.21)}$$

for the diffuse invariants, and $$|L^{ab}_{\alpha\beta}| = |v|^2 - |v| \quad \text{(Equation 3.22)}$$

for the BRDF invariants. These invariants may not be independent or even well-defined. The true amount of independent and valid invariants depends on the placement of the viewpoints and the illumination gradient used. If one of the diffuse invariants $$L^{ab}_\lambda$$

is zero, then we cannot use the invariant to compute the BRDF invariants. These singularities are detected and may be excluded from the estimation process.

VI. Normal Estimation using BRDF Invariants

Embodiments of the invention involve determining, for a given point on a surface of the subject, a value for the measured invariants. Then, a first normal $\vec{n}$ is selected. Using the first normal $\vec{n}$, the estimated invariants are calculated for the point. If the measured invariants are equal to the estimated invariants using the first normal, then the first normal is the correct normal. However, if the first normal is not correct (i.e., the measured invariants are not equal to the estimated invariants using the first normal), then a second normal is selected. Then, using the second normal, the estimated invariants are calculated for the point. This process is repeated until the correct normal is located.

In one embodiment, the estimated invariants approximately match the measured invariants for a correct normal $\vec{n}^*$. This leads to a minimization problem:

$$\vec{n}^* := \underset{\vec{n} \in \Omega}{\arg\min}\left\|\sum\|\hat{L}^{ab}_{\alpha\beta}(\vec{n}) - L^{ab}_{\alpha\beta}\|^2\right\|, \quad \text{(Equation 3.23)}$$

where the sum is calculated over all valid invariants. Every viewpoint introduces additional invariants, but also two unknowns. In a setup with two viewpoints (i.e, two cameras), the equations need to compensate four unknowns. The invariant count introduced above indicated that the number of invariants from two viewpoints is two, at best. Thus, using two viewpoints results in an under-constrained setup. Exploiting joint camera positioning adds an additional constraint, but the problem remains under-constrained and we can expect ambiguous estimations. To constrain the problem sufficiently, embodiments of the invention may use at least three viewpoints.

VII. Gradient Illumination

As described above, embodiments of the invention rely on a calibrated setup that provides knowledge of the position and color of every point on a light dome surrounding the subject. In some embodiments, a spatially-varying color gradient may be used. The choice of the gradient is tailored to the diffuse invariants:

$$L^{ab}_\lambda = \frac{L_{o,s}(\vec{x}_o, \vec{w}_a, \lambda)}{F_t(\vec{w}_a, \vec{n}_o, \lambda)} - \frac{L_{o,s}(\vec{x}_o, \vec{w}_b, \lambda)}{F_t(\vec{w}_b, \vec{n}_o, \lambda)},$$

described in Equation 3.6, as well as the BRDF invariants $$L^{ab}_{\alpha\beta} = \frac{L^{ab}_\alpha}{L^{ab}_\beta},$$

described in Equation 3.11. The diffuse invariants are finite differences, so embodiments of the invention can investigate the first derivative of the gradient. For the gradient to remain discriminative, the derivative should not be constant—at least not for all color channels. Since the BRDF invariants form a ratio of two diffuse invariants, embodiments of the invention use a linear gradient for the denominator. This technique is beneficial since the denominator serves as a normalization factor and a constant derivative provides the same basis for all normals. The choice of the gradients for the remaining channels is motivated by two considerations. On the one hand, the invariants formed by the derivatives of these gradients should be unique within the domain of possible normals. On the other hand, to allow for a good angular resolution, the invariants of adjacent normals should differ as much as possible. These two considerations contradict each other since the first consideration suggests a low-frequency, ideally monotonic gradient, while the second consideration suggests the use of high-frequency content. According to various embodiments, different techniques may be used to calibrate the environment and provide the appropriate gradient.

For example, different gradients may be used, ranging from simple monotonic to two-dimensional sinusoidal gradients. One observation is that higher frequency gradients lead to better contrasts and, thus, more robust estimation at higher angular precision. However, due to the setup used, higher frequency gradients contain too many redundancies. In embodiments that use only two viewpoints, the cameras are collinear, causing the invariants to be based on one-dimensional, finite differences on a two-dimensional surface. The direction of these differences can be restricted by the camera placement, but cannot be predicted exactly. In some embodiments, the gradient is designed so that it is maximally stable, meaning that the one-dimensional finite differences are well-defined within these restrictions. Also, to allow for good disambiguation of normals, the signs (i.e., "+" or "−") of these finite differences should form all possible combinations. Considering these constraints, one embodiment provides gradients consisting of one horizontal and linear gradient in one color channel for normalization, and quadratic gradients in the other color channels enclosing angles of ±45° with the horizontal axis.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for invariant-based normal estimation, the method comprising:
    calculating a set of measured invariants for a point associated with a surface of an object, wherein the set of measured invariants is based on color gradients from at least two color channels, wherein the two color channels are captured from two distinct viewpoints, wherein the color gradients include at least a horizontal gradient and a linear gradient in one of the color channels for normalization, and wherein the other color channel includes quadratic gradients which enclose angles of ±45 degrees with a horizontal axis;
    calculating one or more sets of estimated invariants for the point associated with the surface of the object, wherein each set of estimated invariants is based on a known lighting environment for the object and a different normal for the point associated with the surface of the object; and
    determining a first normal for the point associated with the surface of the object that results in the set of measured invariants corresponding to a first set of estimated invariants.

2. The method of claim 1, wherein determining the first normal comprises determining that the first set of estimated invariants equals the set of measured invariants.

3. The method of claim 1, wherein determining the first normal comprises determining that the first set of estimated invariants has a minimal difference to the set of measured invariants relative to the other sets of estimated invariants.

4. The method of claim 1, wherein the pixel information comprises color intensity values for one or more different color channels.

5. The method of claim 4, wherein the color channels comprise red, green, and blue color channels.

6. The method of claim 1, wherein, within the known lighting environment, a light direction is known for a plurality of points on a light stage surrounding the object.

7. The method of claim 6, wherein the points included in the plurality of points are randomly sampled points associated with the light stage.

8. The method of claim 6, wherein the light stage comprises a cubical light tent or a spherical light tent.

9. The method of claim 6, wherein the known lighting environment comprises a spatially varying lighting gradient applied to the light stage.

10. The method of claim 1, further comprising:
    calculating a set of measured invariants for each of a plurality of other points associated with the surface of the object, wherein the set of measured invariants is based on color gradients from two or more color channels, wherein the two or more color channels are captured from two or more viewpoints;
    for each of the other points, calculating one or more sets of estimated invariants; and
    for each of the other points, determining a normal that results in a set of measured invariants associated with the other point to correspond to a particular set of estimated invariants, wherein a three-dimensional geometry is generated based on the first normal and a normal associated with each of the other points.

11. The method of claim 1, wherein calculating the set of measured invariants comprises calculating a difference between a first color intensity value associated with a first color channel and a first sensing device and a second color intensity value associated with the first color channel and a second sensing device.

12. The method of claim 11, wherein the sensing device comprises a camera or a light sensing device.

13. The method of claim 1, wherein calculating each set of estimated invariants comprises calculating a difference between a first value associated with an incident light angle of a first sensing device relative to a normal and a second value associated with an incident light angle of a second sensing device relative to the normal.

14. The method of claim 1, wherein the object comprises a human head, and the surface comprises a human face.

15. The method of claim 1, further comprising generating a three-dimensional geometry for the object based on the first normal.

16. A non-transitory computer-readable storage medium storing instructions that, when executed by a processor, cause a computer system to perform invariant-based normal estimation, by performing the steps of:
    calculating a set of measured invariants for a point associated with a surface of an object, wherein the set of measured invariants is based on color gradients from at least two color channels, wherein the two color channels are captured from two distinct viewpoints, wherein the color gradients include at least a horizontal gradient and a linear gradient in one of the color channels for normalization, and wherein the other color channel includes quadratic gradients which enclose angles of ±45 degrees with a horizontal axis;

calculating one or more sets of estimated invariants for the point associated with the surface of the object, wherein each set of estimated invariants is based on a known lighting environment for the object and a different normal for the point associated with the surface of the object; and determining a first normal for the point associated with the surface of the object that results in the set of measured invariants corresponding to a first set of estimated invariants.

17. The computer-readable storage medium of claim 16, wherein determining the first normal comprises determining that the first set of estimated invariants equals the set of measured invariants.

18. The computer-readable storage medium of claim 16, wherein determining the first normal comprises determining that the first set of estimated invariants has a minimal difference to the set of measured invariants relative to the other sets of estimated invariants.

19. The computer-readable storage medium of claim 16, wherein the pixel information comprises color intensity values for one or more different color channels.

20. The computer-readable storage medium of claim 19, wherein the color channels comprise red, green, and blue color channels.

21. The computer-readable storage medium of claim 16, wherein, within the known lighting environment, a light direction is known for a plurality of points on a light stage surrounding the object.

22. The computer-readable storage medium of claim 21, wherein the points included in the plurality of points are randomly sampled points associated with the light stage.

23. The computer-readable storage medium of claim 21, wherein the light stage comprises a cubical light tent or a spherical light tent.

24. The computer-readable storage medium of claim 6, wherein the known lighting environment comprises a spatially varying lighting gradient applied to the light stage.

25. The computer-readable storage medium of claim 16, further comprising:

calculating a set of measured invariants for each of a plurality of other points associated with the surface of the object, wherein the set of measured invariants is based on color gradients from two or more color channels, wherein the two or more color channels are captured from two or more viewpoints;

for each of the other points, calculating one or more sets of estimated invariants; and for each of the other points, determining a normal that results in a set of measured invariants associated with the other point to correspond to a particular set of estimated invariants, wherein a three-dimensional geometry is generated based on the first normal and a normal associated with each of the other points.

26. The computer-readable storage medium of claim 16, wherein calculating the set of measured invariants comprises calculating a difference between a first color intensity value associated with a first color channel and a first sensing device and a second color intensity value associated with the first color channel and a second sensing device.

27. The computer-readable storage medium of claim 26, wherein the sensing device comprises a camera or a light sensing device.

28. The computer-readable storage medium of claim 16, wherein calculating each set of estimated invariants comprises calculating a difference between a first value associated with an incident light angle of a first sensing device relative to a normal and a second value associated with an incident light angle of a second sensing device relative to the normal.

29. The computer-readable storage medium of claim 16, wherein the object comprises a human head, and the surface comprises a human face.

30. The computer-readable storage medium of claim 16, further comprising generating a three-dimensional geometry for the object based on the first normal.

31. A system for invariant-based normal estimation, the system comprising:

a processor configured to:

calculate a set of measured invariants for a point associated with a surface of an object, wherein the set of measured invariants is based on color gradients from at least two color channels, wherein the two color channels are captured from two distinct viewpoints, wherein the color gradients include at least a horizontal gradient and a linear gradient in one of the color channels for normalization, and wherein the other color channel includes quadratic gradients which enclose angles of ±45 degrees with a horizontal axis, calculate one or more sets of estimated invariants for the point associated with the surface of the object, wherein each set of estimated invariants is based on a known lighting environment for the object and a different normal for the point associated with the surface of the object, and determine a first normal for the point associated with the surface of the object that results in the set of measured invariants corresponding to a first set of estimated invariants.

32. The system of claim 25, further comprising a memory storing instructions that, when executed by the processor, configure the processor to:

calculate the set of measured invariants;

calculate the one or more sets of estimated invariants; and determine the first normal.

* * * * *

UNITED STATES PATENT AND TRADEMARK OFFICE
CERTIFICATE OF CORRECTION

PATENT NO. : 8,611,674 B1
APPLICATION NO. : 12/689172
DATED : December 17, 2013
INVENTOR(S) : Beeler et al.

It is certified that error appears in the above-identified patent and that said Letters Patent is hereby corrected as shown below:

In the Specification:

In the Detailed Description of Exemplary Embodiments:

Column 11, Lines 62-63, please delete

"$o,d(\bar{x}_o,\bar{w}_o,\lambda) = \int_A \int_\Omega S_d(\bar{x}_o,\bar{w}_o;\bar{x}_i,\bar{x}_o,\lambda) f(\bar{w}_i,\bar{n}_i) L_i(\bar{x}_i,\bar{w}_i,\lambda) d\bar{w}_i dA(\bar{x}_i)$"

and insert

-- $L_{o,d}(\bar{x}_o,\bar{w}_o,\lambda) = \int_A \int_\Omega S_d(\bar{x}_o,\bar{w}_o;\bar{x}_i,\bar{x}_o,\lambda) f(\bar{w}_i,\bar{n}_i) L_i(\bar{x}_i,\bar{w}_i,\lambda) d\bar{w}_i dA(\bar{x}_i)$ -- therefor;

Column 14, Lines 37-38, please delete

"$E = \dfrac{\alpha I + b}{\Delta t}$"

and insert

-- $E = \dfrac{aI + b}{\Delta t}$ -- therefor.

Signed and Sealed this
Twenty-fifth Day of March, 2014

Michelle K. Lee
*Deputy Director of the United States Patent and Trademark Office*